US007837801B2

(12) United States Patent
Christopher et al.

(10) Patent No.: US 7,837,801 B2
(45) Date of Patent: Nov. 23, 2010

(54) APPARATUS AND METHOD FOR CLEANING AN OPTICAL FIBER

(75) Inventors: Anthony J. Christopher, Andover, MA (US); Mark S. Aude, North Andover, MA (US)

(73) Assignee: kSARIA Corporation, Lawrence, MA (US)

( * ) Notice: Subject to any disclaimer, the term of this patent is extended or adjusted under 35 U.S.C. 154(b) by 1094 days.

(21) Appl. No.: 11/447,823

(22) Filed: Jun. 6, 2006

(65) Prior Publication Data
US 2008/0000037 A1    Jan. 3, 2008

(51) Int. Cl.
*B08B 7/00* (2006.01)
(52) U.S. Cl. ............... 134/6; 134/9; 134/15; 134/42; 15/97.1; 15/104.94; 15/210.1; 15/244.1; 385/70; 385/85; 385/92
(58) Field of Classification Search .......... 15/97.1, 15/104.94, 210.1, 244.1; 385/70, 85, 92; 134/6, 9, 15, 42
See application file for complete search history.

(56) References Cited

U.S. PATENT DOCUMENTS

| 5,117,528 | A  | * | 6/1992 | Kanayama et al. | ......... 15/210.1 |
| 6,209,163 | B1 | * | 4/2001 | Clairadin et al. | ............. 15/97.1 |
| 6,560,811 | B1 | * | 5/2003 | Krause et al. | ............... 15/210.1 |
| 6,758,605 | B1 | * | 7/2004 | Villemaire et al. | ............. 385/85 |
| 2002/0108636 | A1 | * | 8/2002 | Childers et al. | ................ 134/6 |
| 2003/0169992 | A1 | * | 9/2003 | Fujiwara et al. | ............. 385/134 |
| 2004/0007250 | A1 | * | 1/2004 | Forrest, Jr. | ...................... 134/6 |
| 2004/0086232 | A1 | * | 5/2004 | Fujiwara et al. | ................ 385/53 |
| 2006/0191091 | A1 | * | 8/2006 | Kida | .......................... 15/210.1 |
| 2007/0023067 | A1 | * | 2/2007 | Kida et al. | ...................... 134/6 |

FOREIGN PATENT DOCUMENTS

JP          09-197182      *   1/1997

OTHER PUBLICATIONS

Seikoh Giken USA "Interconnect Maintenance Solutions" Data Sheet, 1pg. assume prior art.
Clean Blast "CleanBlast Fiber Optic Connector End-Face Cleaning System" brochure, 6pps. assume prior art.

* cited by examiner

*Primary Examiner*—Sheridan Carrillo
(74) *Attorney, Agent, or Firm*—Wolf, Greenfield & Sacks, P.C.

(57) ABSTRACT

An apparatus and method for cleaning an optical fiber supported by a fiber optic connector. The cleaning apparatus may include a housing, a cleaning tip supported by the housing and a cleaning wipe advanceable along at least a portion of the cleaning tip to clean an optical fiber when the cleaning wipe engages the optical fiber. The apparatus may include one or more automated features which may enhance the effectiveness of the apparatus. The apparatus may include a fluid dispenser to wet at least a portion of the cleaning wipe with a cleaning fluid. The apparatus may be configured to automatically control the force exerted by the cleaning tip against the optical fiber and/or to automatically control tension in the cleaning wipe. Aspects of the invention are directed to a method of cleaning an end face of an optical fiber by advancing a wet portion of a cleaning wipe across the end face, and thereafter advancing a dry portion of the cleaning wipe across the end face. A cleaning wipe may also be provided with at least one fluid barrier to prevent fluid flow between two adjacent portions of the cleaning wipe.

13 Claims, 11 Drawing Sheets

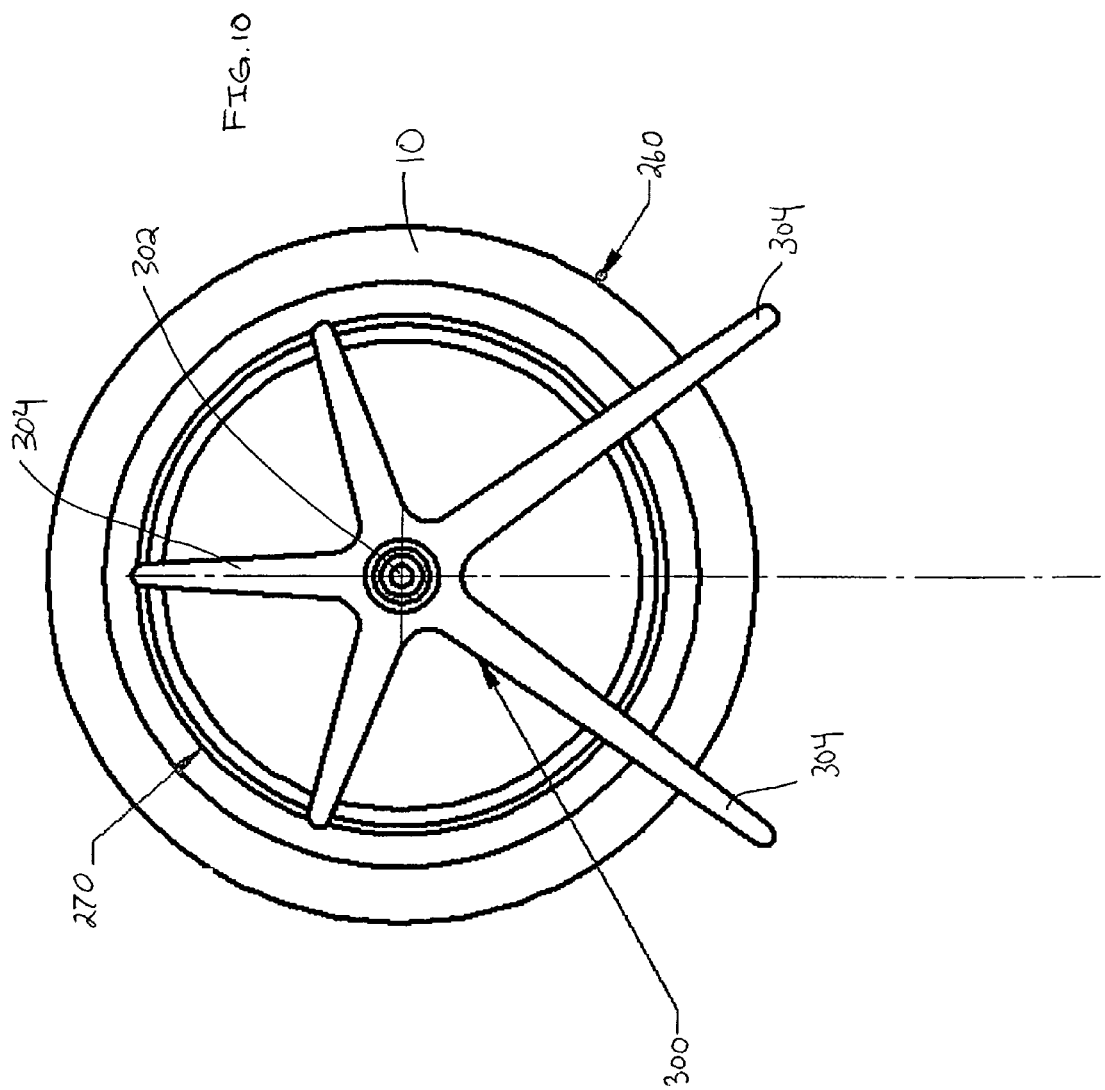

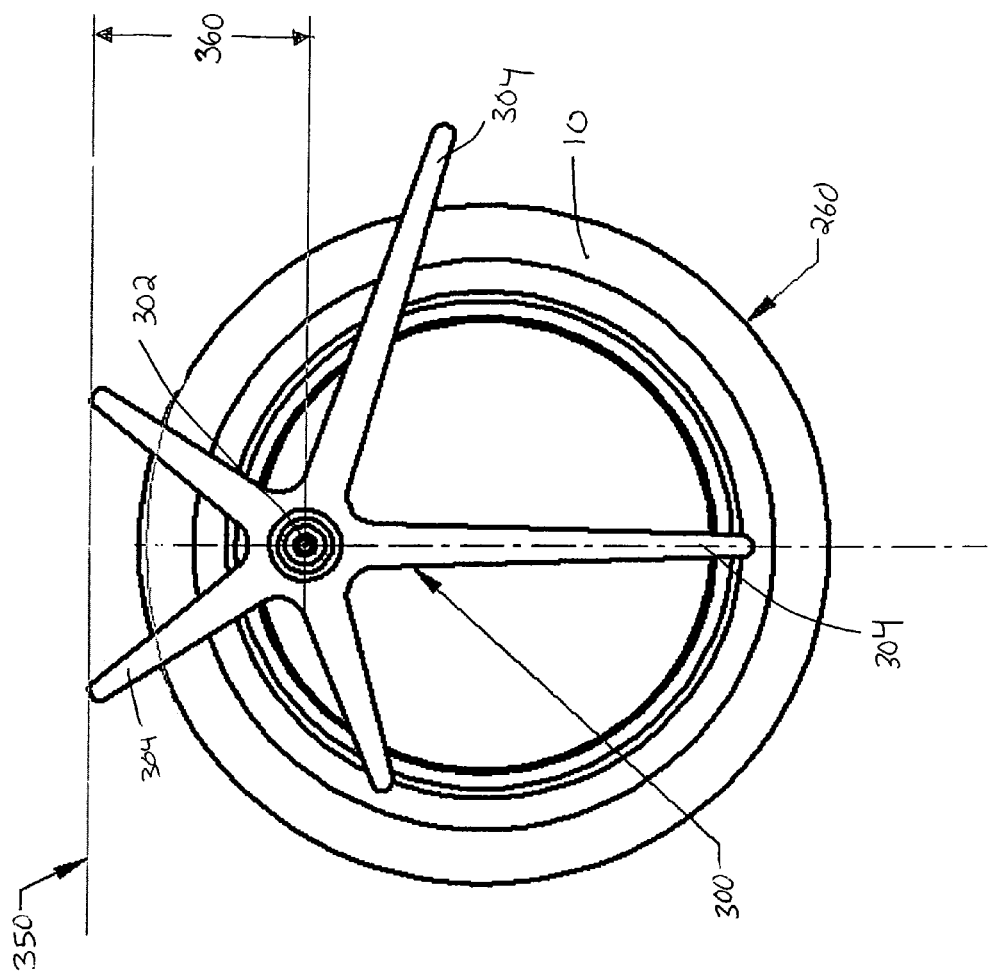

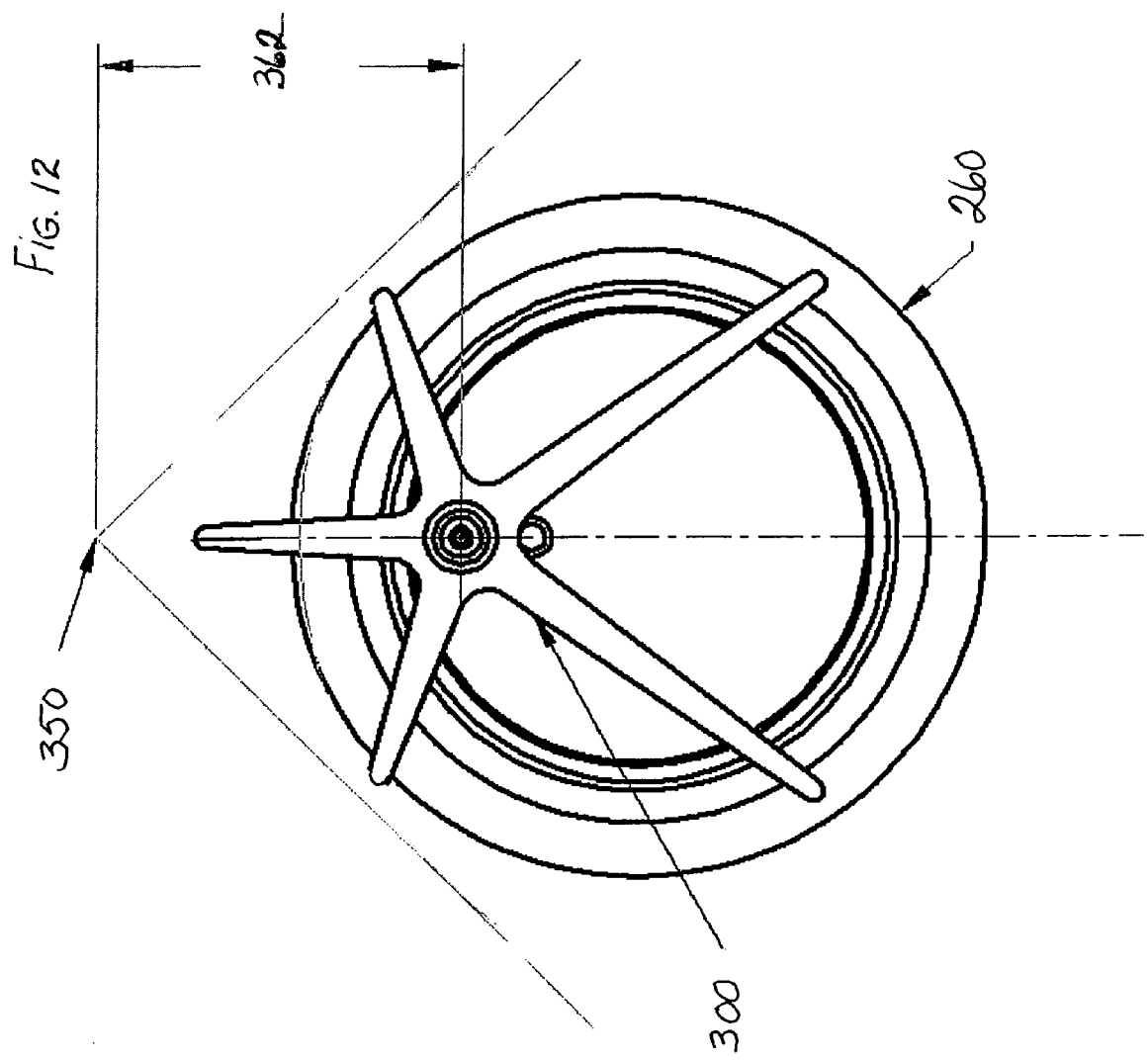

APPARATUS AND METHOD FOR CLEANING AN OPTICAL FIBER

GOVERNMENT SUPPORT

This invention was made with Government support under Grant number N68335-05-C-0046, awarded by the Department of the Navy. The Government has certain rights in this invention.

FIELD OF THE INVENTION

The present invention relates to cleaning fiber optic systems, and more particularly, to an apparatus and method for cleaning an optical fiber which is supported by a fiber optic connector.

BACKGROUND OF INVENTION

Fiber optic systems are used in a variety of applications. Generally, in a fiber optic system, information in the form of a light signal is transmitted between different portions of the fiber optic system through an optical fiber. End faces of two optical fibers may be axially aligned and placed into contact under a predetermined axial load to make a point-to-point signal connection. Various types of connectors may be used to assist in making the signal connection between optical fibers.

FIG. 1 illustrates one example of a multi-channel connector 10 that may be used to connect optical fibers. The connector 10 includes a male component 14 and a female component 16. The female component 16 has multiple cavities 12 and may be used in combination with the male component 14 to align and couple multiple pairs of optical fibers 18 inside the cavities 12.

Because the signal transmitted between the optical fibers is light, it is desirable to minimize the amount of contaminants that may be present on the end faces of an optical fiber. Contaminants may block the transmission of the light signal through the end face of the optical fiber. Contaminants may also scratch the end face which may affect the ability of the fiber to transmit a signal even after the contaminant is removed. Scratches on the optical fiber may render an optical fiber inoperable.

Examples of contaminates may include, but are not limited to oil, salt, fuel, baked-on dust and de-icer. Such contaminants are commonly encountered in certain military environments.

One approach to cleaning the end face of an optical fiber is with an alcohol soaked, lint-free wipe. This approach may be effective when the end face of the optical fiber is accessible. However, this approach is not very effective when the end face of the optical fiber is recessed within a connector, because the end face is not readily accessible to the wipe. Several techniques may be employed to remove contaminants from the end face of an optical fiber that is not readily accessible.

In one technique, an operator may dissemble portions of the connector to expose the end face of the optical fiber. Once dissembled, an alcohol soaked wipe may be used to remove contaminants, and thereafter the connector may be reassembled. Although this approach may be effective at removing some contaminants, the disassembly and reassembly process associated with this technique is typically labor intensive. The reassembling process may also stir up additional contaminants onto the end face of the optical fiber after the optical fiber has been cleaned. Also, in some circumstances, this technique may not be desirable because multiple fibers may be bundled together on the backside of the connector making it difficult to easily dissemble the connector. Furthermore, disassembling and reassembling the connector may lead to mishandling of the fiber which may potentially damage the end face of the fiber and may even render the optical fiber inoperable.

Another technique to remove contaminants from the end face of an optical fiber employs an alcohol soaked, lint-free swab. The swab may be inserted into the connector to wipe the end face of the fiber to dislodge contaminants. Although a swab may be easy to use, the swabs are expensive and are less effective at removing contaminants in comparison to a larger wipe. Often times, multiple swabs are needed to clean one end face which further escalates costs.

It is an object of the present invention to provide an apparatus and method for cleaning an optical fiber which is supported by a fiber optic connector.

SUMMARY OF INVENTION

In one illustrative embodiment of the invention, an apparatus is provided for cleaning an optical fiber supported by a fiber optic connector. The apparatus comprises a housing and a cleaning tip supported by the housing. The apparatus further comprises a cleaning wipe that is advanceable along at least a portion of the cleaning tip to clean a portion of an optical fiber when the cleaning wipe engages the optical fiber. The apparatus also comprises a fluid dispenser supported by the housing that is constructed and arranged to wet at least a portion of the cleaning wipe with a cleaning fluid.

In another illustrative embodiment of the invention, an apparatus is provided for cleaning an optical fiber supported by a fiber optic connector. The apparatus comprises a housing and a cleaning tip movably supported by the housing. The apparatus further comprises a cleaning wipe that is advanceable along at least a portion of the cleaning tip to clean a portion of an optical fiber when the cleaning wipe engages the optical fiber. The apparatus further comprises a force controller constructed and arranged to automatically control force exerted by the cleaning tip against the optical fiber in response to a force control signal.

In a further illustrative embodiment of the invention, an apparatus is provided for cleaning an optical fiber supported by a fiber optic connector. The apparatus comprises a housing and a cleaning tip supported by the housing. The apparatus further comprises a cleaning wipe that is advanceable along at least a portion of the cleaning tip to clean a portion of an optical fiber when the cleaning wipe engages the optical fiber. The apparatus also comprises a tension controller constructed and arranged to automatically control tension in the cleaning wipe in response to a tension control signal.

In another illustrative embodiment of the invention, a method of cleaning an optical fiber supported by a fiber optic connector is provided. The method comprises acts of (a) providing a cleaning apparatus that includes a cleaning wipe that is advanceable along at least a portion of the cleaning apparatus; (b) wetting a portion of the cleaning wipe with a cleaning fluid, while an adjacent dry portion of the cleaning wipe remains substantially free of the fluid; (c) advancing the wet portion of the cleaning wipe across the end face of an optical fiber supported by a fiber optic connector; and (d) advancing the dry portion of the cleaning wipe across the end face of the optical fiber.

In a further illustrative embodiment, a method of cleaning an optical fiber supported by a fiber optic connector is provided. The method comprises acts of (a) providing a cleaning apparatus, the cleaning apparatus including a cleaning wipe that is advanceable along at least a portion of the cleaning apparatus; (b) engaging a portion of the cleaning wipe with an optical fiber supported by a fiber optic connector to clean a portion of the optical fiber with the cleaning wipe; and (c) automatically controlling the force exerted by the cleaning wipe in response to a force control signal when the cleaning wipe contacts the optical fiber.

In yet another illustrative embodiment, a method of cleaning an optical fiber supported by a fiber optic connector is provided. The method comprises acts of (a) providing a cleaning apparatus, the cleaning apparatus including a cleaning wipe that is advanceable along at least a portion of the cleaning apparatus to clean a portion of an optical fiber supported by a fiber optic connector when the cleaning wipe engages the optical fiber; and (b) automatically controlling tension in the cleaning wipe in response to a tension control signal.

In a further illustrative embodiment, an apparatus is provided for cleaning an optical fiber supported by a fiber optic connector. The apparatus comprises a housing and a cleaning media supported by the housing. The cleaning media is constructed and arranged to clean an optical fiber supported by a fiber optic connector. The apparatus further comprises a stabilizer supported by the housing, the stabilizer constructed and arranged to engage the connector and to stabilize the housing with respect to the connector by maintaining the housing at a fixed angular orientation relative to the connector.

BRIEF DESCRIPTION OF DRAWINGS

Various embodiments of the invention will now be described, by way of example, with reference to the accompanying drawings, in which:

FIGS. 10-12 illustrate a fiber optic connector with a stabilizer according to one illustrative embodiment in different orientations with respect to the connector.

DETAILED DESCRIPTION

Figure 1:
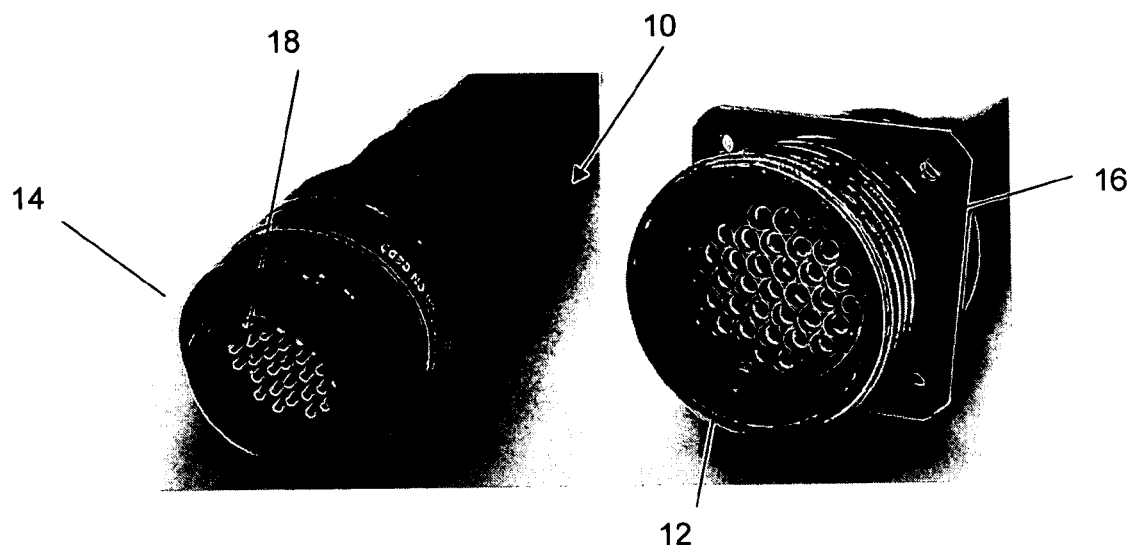
FIG. 1 is a perspective view of an exemplary multi-channel fiber optic connector.

The present invention is directed to an apparatus and method for cleaning the end face of an optical fiber which is supported by a fiber optic connector. It should be appreciated that the apparatus may be configured in any of numerous ways, and that the present invention is not limited to the particular apparatus and techniques described below. Furthermore, it should also be appreciated that the below described methods for cleaning an optical fiber are not limited to be performed only with the various apparatus described below.

The invention is more particularly directed to an apparatus and method for removing one or more contaminants from the end face of an optical fiber. As discussed above, an optical fiber may be exposed to various types of contaminants including, but not limited to, oil, salt, fuel, baked-on dust, and de-icer. These contaminants may affect the quality of the signal transmitted between end faces of the optical fibers. In some circumstances, contaminants may obstruct the transmission of the light signal entirely. In other circumstances, contaminants may scratch or otherwise alter the optical properties of the end face of an optical fiber which may damage the fiber and may even result in an inoperable optical fiber. In such circumstances, the fiber may need to be replaced which may be expensive and time consuming.

The cleaning apparatus of the present invention may include a cleaning wipe for engaging and wiping a portion of an optical fiber. The cleaning wipe may be advanceable along a portion of the cleaning apparatus to produce a wiping action along the optical fiber. The cleaning apparatus may include a cleaning tip, and the cleaning wipe may be advanceable along at least a portion of the cleaning tip to clean the optical fiber.

The cleaning tip may also be advanceable with respect to a portion of the cleaning apparatus. The cleaning tip may advance in a linear direction and/or a rotational direction to access and clean an optical fiber. In some embodiments, the cleaning tip may be constructed to fit within portions of the fiber optic connector to access an end face of an optical fiber, such that the cleaning wipe may readily wipe the end face of an optical fiber even when the optical fiber is recessed within a fiber optic connector. The cleaning apparatus may be configured to clean the end face of an optical fiber recessed within a fiber optic connector without requiring disassembly of the connector.

Illustrative embodiments of the cleaning apparatus may include a cleaning fluid dispenser. Certain types of contaminants may be easier to remove from the optical fiber with the use of a cleaning fluid, and the amount of fluid used to remove a certain type of contaminant may depend upon the particular type of contaminant. As described in greater detail below, the cleaning apparatus may include a fluid dispenser to dispense a cleaning fluid onto at least a portion of the cleaning wipe to assist in the removal of contaminants. However, it is to be appreciated that a fluid dispenser is not required for each embodiment of the cleaning apparatus.

In one aspect of the present invention, the cleaning apparatus is configured to wet only a portion of the cleaning wipe. In this manner, as the cleaning wipe is advanced across the end face of the optical fiber, the fiber may be subjected to alternating steps of wet and dry wiping. In one illustrative embodiment, the cleaning wipe may include at least one fluid barrier positioned between portions of the cleaning wipe to inhibit wicking of fluid along the cleaning wipe. In one embodiment, a cleaning wipe with a fluid barrier may be used to assist in carrying out the alternating steps of wet and dry wiping by preventing fluid from a wet portion to migrate into an adjacent dry portion.

In one aspect of the present invention, the cleaning apparatus may include a force controller to control the amount of force exerted by the cleaning apparatus against an optical fiber. A certain amount of force against the optical fiber may be needed to adequately engage the fiber to clean and remove certain contaminants from the optical fiber. However, optical fibers may be fragile and excessive force exerted against the end face of an optical fiber may potentially damage and/or break the optical fiber. In one embodiment, the force controller controls the force exerted by the cleaning tip against an optical fiber. A cleaning apparatus with a force controller may reduce and/or eliminate the incidence of optical fiber damage which may otherwise occur while removing contaminants from the optical fiber. However, it is to be appreciated that a force controller is not required for each embodiment of the cleaning apparatus.

In another aspect of the present invention, the cleaning apparatus may include a tension controller to control tension in the cleaning wipe. Tension in the cleaning wipe may increase as the cleaning wipe is advanced along the cleaning tip. Tension may also increase when the cleaning wipe engages the optical fiber to clean the fiber. However, excessive tension in the cleaning wipe may potentially lead to tearing of the cleaning wipe which may affect the operability of the cleaning apparatus. Furthermore, when a cleaning wipe is wetted with a cleaning fluid, the cleaning wipe may become even more susceptible to tearing under tension. It should be appreciated that a tension controller is not required for each embodiment of the cleaning apparatus.

Aspects of the invention are directed to an automated apparatus for cleaning an optical fiber. An automated cleaning apparatus may enhance the effectiveness of the device to clean a fiber optic connector and may help to minimize optical fiber damage which may result from operator error. The apparatus may include one or more automated features including, but not limited to, controlling the advancement of the cleaning wipe, controlling the dispensing of a cleaning fluid, controlling the force of the cleaning tip exerted against an optical fiber, controlling the tension in the cleaning wipe, controlling the amount of cleaning wipe advanced along the cleaning tip and controlling the length of time for one cleaning cycle for an optical fiber. However, it should be appreciated that certain embodiments of the present invention may not be automated.

Aspects of the invention are also directed to a hand-held apparatus for cleaning an optical fiber supported by a fiber optic connector. As the use of fiber optic systems continues to increase, there is an increasing need for a field service tool which can quickly and effectively clean optical fibers within connectors. However, it should be appreciated that certain embodiments of the present invention may not be hand-held.

Figure 2:
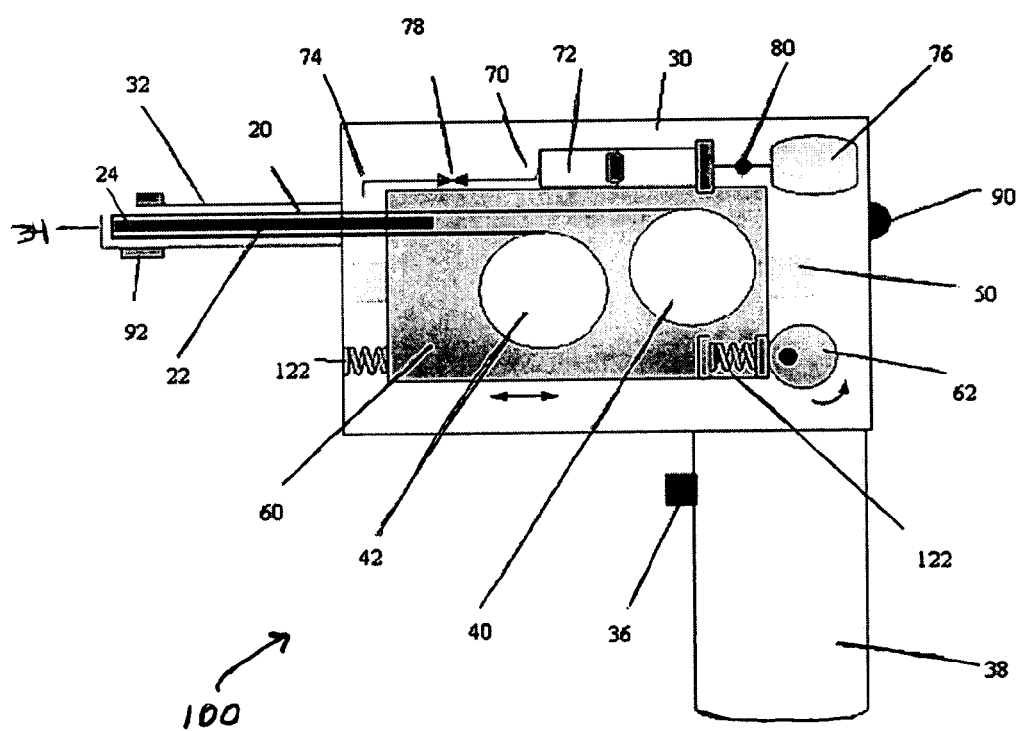
FIG. 2 is a schematic view of an apparatus for cleaning an optical fiber according to one illustrative embodiment.

FIG. 2 illustrates a schematic of one embodiment of an apparatus 100 for cleaning an optical fiber according to the invention. It should be appreciated that the apparatus 100 may be used to remove contaminants from a variety of types of fiber optic connectors, including, but not limited to the connector 10 illustrated in FIG. 1. It should also be recognized that the cleaning apparatus 100 is not limited to only removing contaminants such as oil, salt, fuel, baked-on dust and de-icer, as the invention is not limited in this respect.

In one illustrative embodiment shown in FIG. 2, the apparatus 100 includes a cleaning wipe 20 and a cleaning tip 22. In this embodiment, the cleaning wipe 20 is advanceable along the cleaning tip 22 to clean an optical fiber (not shown). The cleaning tip 22 may be supported by a housing 30, and as described in greater detail below, the cleaning tip 22 may also be moveable relative to the housing 30.

As shown in the embodiment illustrated in FIG. 2, the housing 30 may include an elongated support 32 and the cleaning tip 22 may extend within the elongated support 32. In one embodiment, the cleaning tip 22 may be moved relative to the housing 30 such that the distal end 24 of the cleaning tip 22 extends through an opening 34 in the distal end of the support, in a tongue-like manner, to engage and clean an optical fiber.

The distal end 24 of the cleaning tip 20 may be insertable into portions of a fiber optic connector to clean an optical fiber recessed within the connector. In one embodiment, the width of the cleaning tip 22 and/or the cleaning wipe 20 may vary depending upon the diameter of the optical fiber and/or the cavity 12 to be cleaned.

It is also contemplated that the housing 30 may include a handle 38 so that the apparatus 100 may be held by an operator. As described in further detail below, the housing 30 may also include a trigger 36 to actuate the optical fiber cleaning process.

In some embodiments, the cleaning wipe 20 is advanceable along a portion of the cleaning tip 22. In this respect, a portion of the cleaning wipe 20 may be advanced along the cleaning tip 22 towards the distal end 24 of the tip 22 to clean an optical fiber. Once that portion of the cleaning wipe 20 engages and is advanced across the optical fiber to remove contaminants, that used portion of the cleaning wipe 20 may be advanced away from the optical fiber. The advancement of the cleaning wipe 20 across the fiber produces a wiping action that removes contaminants and may prevent recontamination of the optical fiber with contaminants which are picked up by the cleaning wipe. It should be appreciated that the advancement of the cleaning wipe 30 along the cleaning tip 22 may be continuous or intermittent.

In one illustrative embodiment, a feed reel 40 and a take-up reel 42 may be provided to store the cleaning wipe 20. In one embodiment, a supply of unused cleaning wipe 20 is provided on the feed reel 40. As the cleaning wipe 20 is advanced from the feed reel 40 to clean the optical fiber, the used portion of the cleaning wipe is stored on the take-up reel 42. In particular, at least a portion of the cleaning wipe 20 may be unwound from the feed reel 40 as the cleaning wipe 20 advances along a portion of the cleaning tip 22. Once a portion of the cleaning wipe 20 engages the optical fiber, that portion of the cleaning wipe 20 may then be wound onto the take-up reel 42.

The cleaning tip 22 may move relative to the housing 30 in a variety of ways, as the invention is not so limited. In one illustrative embodiment shown in FIG. 2, a main carriage 60 couples the cleaning tip 22 to the housing 30. As shown in FIG. 2, a linear slide 50 may slideably couple the main carriage 60 to the housing 30, such that the cleaning tip 22 moves in a linear direction relative to the housing 30 when the main carriage 60 moves along the linear slide 50. In one embodiment, a cam actuator 62 produces the movement of the main carriage 60 along the linear slide 50. In one illustrative embodiment shown in FIG. 4, a linear transducer 56 converts the rotary movement of the cam actuator 62 into linear movement and the linear transducer 56 is coupled to a primary and secondary ball slides 58 which move the main carriage 60. However, it is appreciated that other types of mechanisms and actuators may be used both to move the cleaning tip 22 relative to the housing 30, and/or to generate the movement of the cleaning tip 22.

Rotational movement of the cleaning tip 22 relative to the housing 30 is also contemplated to assist in cleaning the optical fiber. The rotational movement of the cleaning tip 22 may help to clean the optical fiber by removing contaminants from areas adjacent to the end face of the optical fiber. For example, when the cleaning tip 22 is inserted into a cavity 12 within a connector, the rotational movement of the cleaning tip 22 allows the cleaning wipe 20 to engage the walls which form the cavity 12. It should be appreciated that according to certain embodiments, cleaning the optical fiber broadly includes cleaning various portions of a connector when the optical fiber is supported by the connector.

Figure 3:
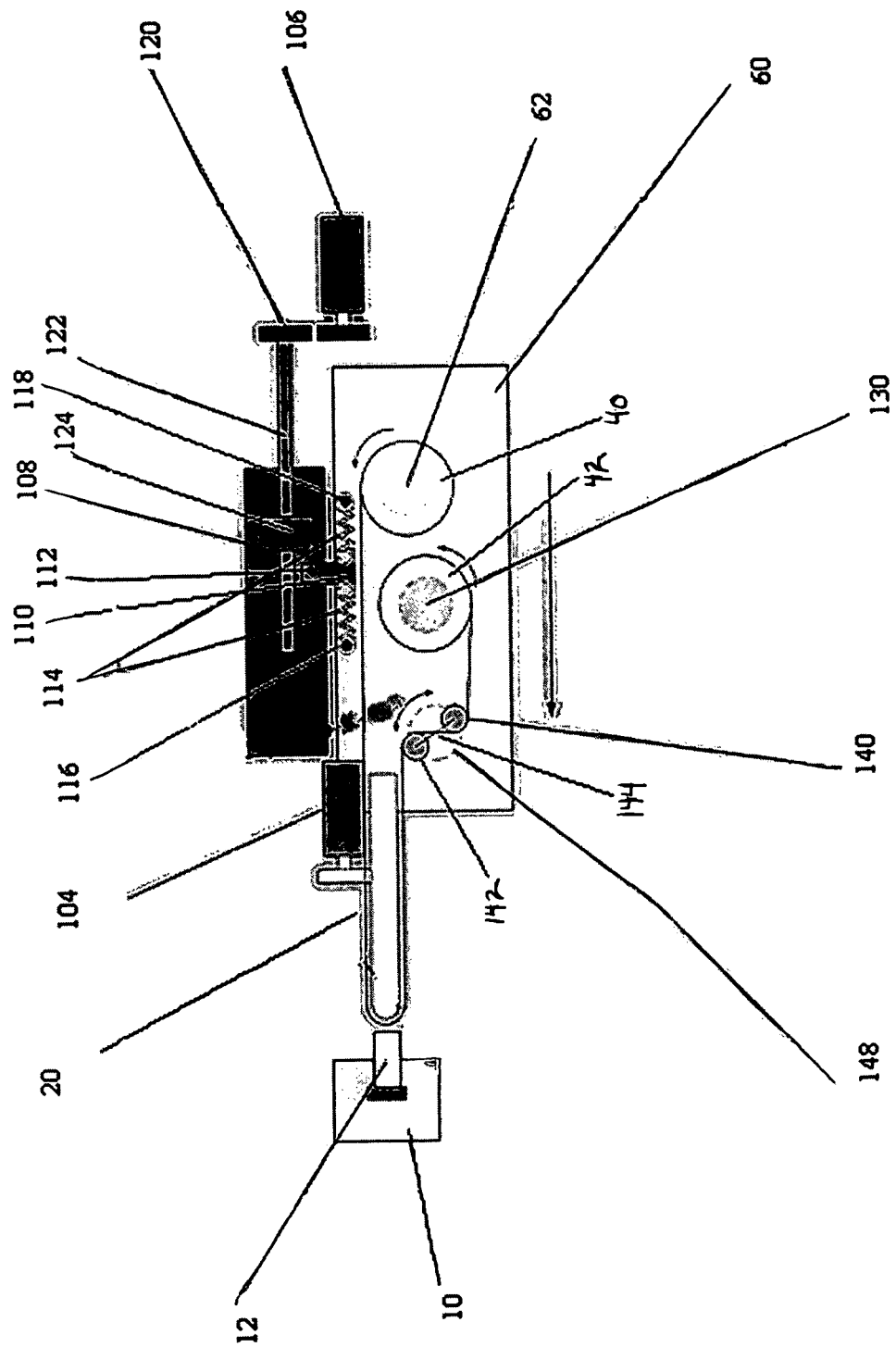
FIG. 3 is schematic view of an apparatus for cleaning an optical fiber according to one illustrative embodiment.

In one illustrative embodiment shown in FIG. 3, an actuator, such as a rotational motor 104, axially rotates the cleaning tip 22 with respect to both the housing 30 and the main carriage 60. In one embodiment, the cleaning tip 22 is configured to rotate approximately 90°. In another embodiment, the cleaning tip is configured to rotate approximately 180°. In yet another embodiment, the cleaning tip 22 is configured to rotate approximately 360°. It is to be understood that the cleaning tip 22 may be configured to rotate any suitable amount apparent to one of skill in the art. It is also contemplated that other types of actuators apparent to one of skill in the art may be used to generate rotational movement of the cleaning tip 22. Furthermore, it should be appreciated that rotational and/or linear movement of the cleaning tip is not required for each embodiment of the cleaning apparatus.

According to one embodiment, a cleaning apparatus 100 as illustrated in FIGS. 2 and 3 may be utilized to clean the end face of an optical fiber. In particular, the cleaning apparatus may be configured to clean the end face of an optical fiber that is recessed within a connector, such as when an optical fiber is recessed within a cavity 12 of a female component 16 of a connector (see FIGS. 1 and 3). The optical fiber to be cleaned may first be aligned with the cleaning apparatus 100 such that the cleaning tip 22 is axially aligned with the optical fiber. Once aligned, the cleaning tip 22 may extend out from the support 32 such that a portion of the cleaning tip 22 advances into the cavity 12 or recess to engage the end face of the optical fiber. To produce a wiping action along the optical fiber, the cleaning wipe 20 may be advanced along the cleaning tip 22 by unwinding a length of the wipe from the feed reel 40 and thereafter winding the used wipe around the take-up reel 42.

It should be appreciated that when the cleaning apparatus is configured to clean an optical fiber that is not recessed, the cleaning tip 22 may not extend out from the support 32. It is contemplated that when cleaning an optical fiber 18 supported by a male component 14 of a connector (See FIG. 1), that the end face of the optical fiber 18 may be inserted into the support 32 of the housing. However, when cleaning an optical fiber which protrudes out from a portion of the connector, the cleaning tip 22 may also extend out from the housing 30 to engage the optical fiber, as the invention is not limited in this respect.

In some embodiments, the cleaning wipe 20 may extend around the distal tip 24 of the cleaning tip 22, as illustrated in FIGS. 2 and 3. As described in greater detail below, portions of the cleaning wipe 20 may be wetted by a fluid dispenser 70, such that wetted portions of the cleaning wipe 20 engage the optical fiber to remove contaminants. Once the optical fiber is cleaned, the advancement of the cleaning wipe 20 may stop and the cleaning tip 22 may be removed from the cavity 12 and may further retract into the housing 30.

Fluid Dispenser

As shown in FIG. 2, one illustrative embodiment of the present invention may include a fluid dispenser 70 to wet at least a portion of the cleaning wipe 20 with a cleaning fluid. As mentioned above, certain contaminants may be easier to remove with a cleaning fluid on the cleaning wipe 20.

The fluid dispenser 70 may include a chamber 72 to hold the cleaning fluid and a conduit 74 to transfer the fluid from the chamber 72 to the cleaning wipe 20. In this embodiment, a pump, such as a pressurized bulb 76, may be used to generate the flow of cleaning fluid to the cleaning wipe 20. A check valve 80 may be positioned between the chamber 72 and the pressurized bulb 76 to prevent backflow of the cleaning fluid towards the pressurized bulb. A control valve 78 may be positioned in the conduit 74 to control the flow of the cleaning fluid onto the cleaning wipe 20. As shown in FIG. 2, the control valve 78 is positioned downstream of the chamber 72 such that the flow of cleaning fluid from the chamber 72 to the cleaning wipe 20 is prevented when the valve 78 is closed. It should be appreciated that other suitable valves and pumps apparent to one of skill in the art may be used with the fluid dispenser 70 as the present invention is not so limited.

Various types of cleaning fluids may be used to wet the cleaning wipe 20 as the present invention is not limited in this respect. In one embodiment, the cleaning fluid may be a solvent-based cleaner. However, other suitable cleaning fluids apparent to one of skill in the art may be used as the present invention is not limited in this respect.

In some situations, it may be desirable to remove the cleaning fluid from the end face of the optical fiber. For example, a cleaning fluid may also act as a contaminant itself. Therefore, according to some embodiments, it may be desirable to also employ a substantially dry cleaning wipe. In certain embodiments, the fluid dispenser is configured to wet one or more portions of the cleaning wipe 20, while leaving other portions of the cleaning wipe 20 substantially dry. In this manner, as the cleaning wipe is advanced across the end face of the optical fiber, the fiber may be subjected to alternating steps of wet and dry wiping.

In one illustrative embodiment, the apparatus is configured to wet only a portion of the cleaning wipe 20 with a cleaning fluid. For example, the fluid dispenser 70 may be used to wet a portion of the cleaning wipe, and in one embodiment, separated portions of the cleaning wipe 20 may be wetted with the cleaning fluid. As mentioned above, cleaning fluids may assist in the removal of certain contaminants from the end face of an optical fiber. However, the cleaning fluid itself may leave a residue on the optical fiber which may alter the optical qualities of the end face, thereby acting as contaminant.

In one illustrative embodiment, a first portion of the cleaning wipe 20 is wetted with a cleaning fluid, while a second portion of the cleaning wipe 20 adjacent the first portion of the cleaning wipe 20 remains substantially free of the fluid. The first portion of the cleaning wipe 20 may be advanced across the end face of an optical fiber to clean the fiber, and thereafter the second portion of the cleaning wipe 20 may be advanced across the end face of the optical fiber to further clean the fiber and may remove cleaning fluid which remained on the fiber.

It is also contemplated that the above-described alternating step of wet and dry wiping may be repeated multiple times. For example, in one illustrative embodiment, a third portion of the cleaning wipe 20, which is separated from the first portion of the cleaning wipe 20 and adjacent the second portion may be wetted with the cleaning fluid, while the second portion, as well as a fourth portion of the cleaning wipe which is also adjacent the third portion remains substantially free of the fluid. The third portion of the cleaning wipe 20 may be advanced across the end face of the optical fiber to further clean the optical fiber. Thereafter, the fourth portion of the cleaning wipe may be advanced across the end face of the optical fiber to further clean the fiber and may remove cleaning fluid remaining on the fiber. According to certain embodiments, this alternating wet/dry technique to clean an optical fiber may be an effective approach to remove various types of contaminants.

Tension Controller

Aspects of the present invention may contemplate controlling the tension in the cleaning wipe 20. The tension in the cleaning wipe 20 may increase when the cleaning wipe 20 is advanced along a portion of the cleaning tip 22. The tension may also increase when the cleaning wipe 20 contacts the optical fiber or fiber optic connector. Such tension may lead to potential tearing of the cleaning wipe 20, which may be undesirable as it may affect the operability of the cleaning apparatus.

Figure 4:
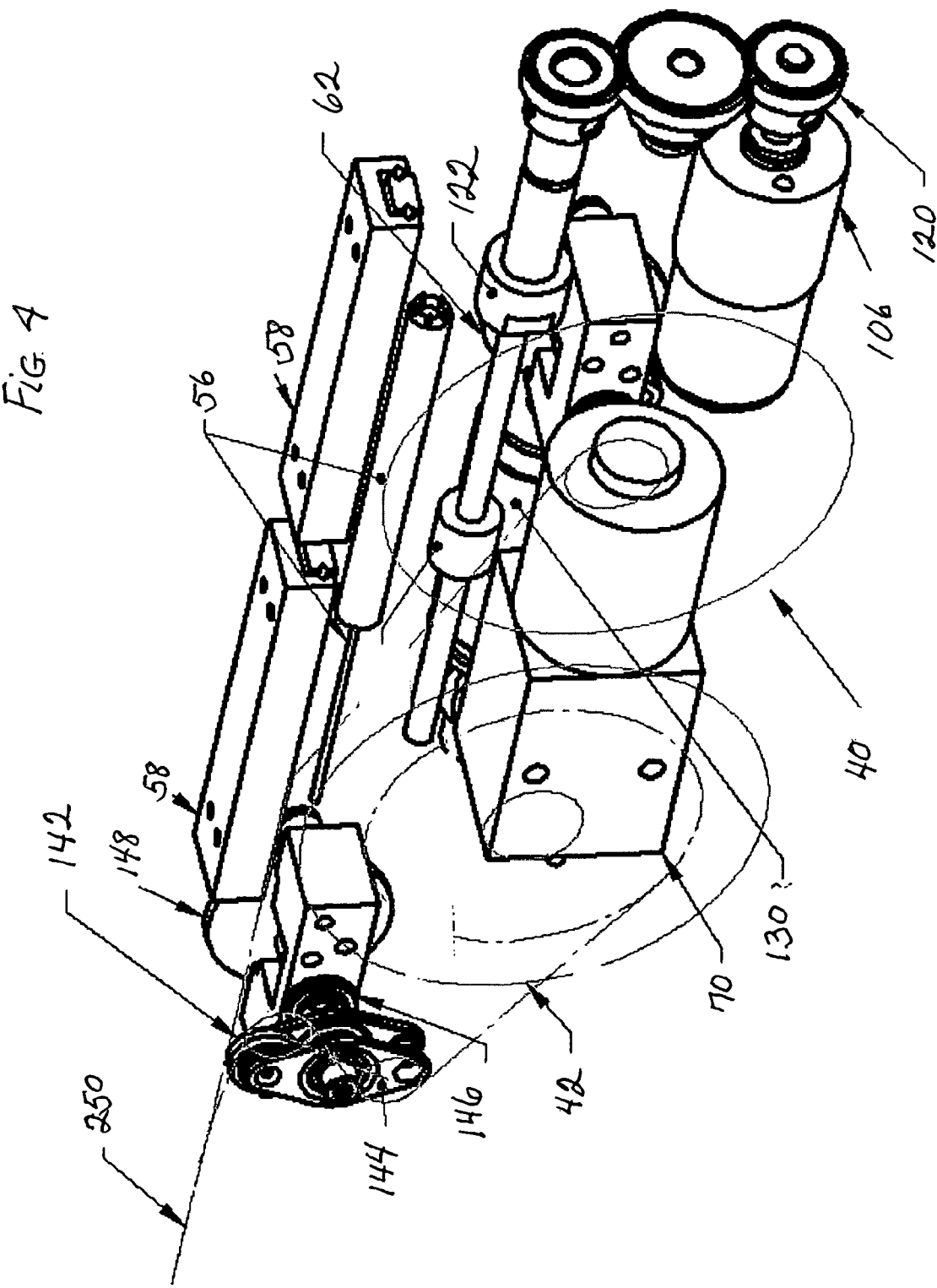
FIG. 4 is an exploded perspective view of a portion of an apparatus for cleaning an optic fiber according to one illustrative embodiment.

One illustrative embodiment of a tension controller will now be described with reference to FIGS. 3 and 4. As explained above, the cleaning wipe 20 may be unwound from a feed reel 40 and wound up onto a take-up reel 42 after the cleaning wipe has cleaned an optical fiber. A drive mechanism, which may include a take-up motor 130, may drive the advancement of the cleaning wipe 20 by rotating the take-up reel 42 in a counter clockwise direction. The rotation of the take-up reel 42 may also draw cleaning wipe from the feed roll 40 which may rotate the feed reel 40 in a counter clockwise direction. A feed reel encoder 62 may be provided to sense the rotational motion of the feed reel 40 which may be used to determine how much and/or how fast the cleaning wipe 20 is being advanced. It should be appreciated that other mechanisms or actuators, such as a feed reel motor (not shown) in combination with or instead of the take-up motor 130 may be employed with the drive mechanism as would be apparent to one of skill in the art.

According to one illustrative embodiment, the tension controller includes a tension dancer arm assembly 140 to control the tension in the cleaning wipe 20. In the embodiment shown in FIG. 4, the tension dancer arm assembly 140 includes a dancer pulley wheel 142 that is rotatably mounted to a dancer arm 144, which is in turn pivotally mounted to a dancer bearing 146. In FIG. 4, the feed reel 40 and take-up reel 42 are depicted in phantom lines to illustrate some of the components positioned behind these reels. As shown in FIG. 3, the cleaning wipe 20 may be threaded through the dancer pulley wheel 142.

As the tension in the cleaning wipe 20 increases, the tension dancer arm assembly 140 rotates which may deflect the dancer arm 144. A dancer encoder 148 or other sensor may be located at the point where the dancer arm 144 is pivotally mounted to the bearing 146 to sense the rotation of the dancer arm 144. The specific tension in the wipe may be calculated by the amount of deflection of the dancer arm 144. Based on this data, the tension in the cleaning wipe 20 may be controlled and maintained by regulating the rate at which the cleaning wipe 20 is dispensed from the feed reel 40 such that constant deflection of the dancer arm 144 is achieved. As discussed in greater detail below, the data from the dancer encoder 148 may be transmitted to a control system which may be configured to regulate the amount of tension in the cleaning wipe 20. It is to be appreciated that other tension controller configurations apparent to one of skill in the art may also be used as the present invention is not limited in this respect.

One of the benefits which may be associated with incorporating a tension controller, such as a tension dancer arm assembly 140, into an apparatus for cleaning an optical fiber is that a tension controller may reduce or eliminate tearing of the cleaning wipe 20 during operation of the cleaning apparatus. A maximum threshold tension may be determined for a specific type of cleaning wipe material, and the tension controller may be used to maintain the tension in the cleaning wipe below that level to reduce the incidence of tearing.

The use of a tension controller may also allow for use of a variety of materials as the cleaning wipe 20. For example, as described below, a non-woven material or a woven material may be used to form the cleaning wipe 20. However, a non-woven material may not be as strong and/or durable as a woven material. In certain embodiments, the tension controller permits the cleaning wipe 20 to be constructed from a less durable material, such as a non-woven material, because the amount of tension in the wipe 20 may be reduced and controlled to prevent tearing of the material.

Additionally, the use of a tension controller may also be beneficial when a cleaning fluid is dispensed onto the cleaning wipe. When the cleaning wipe 20 is wetted, the wipe 20 may become weaker. However, the tension controller may reduce and control the amount of tension in the wipe to reduce tearing which may otherwise be associated with the use of a wet cleaning wipe 20. Therefore, according to certain embodiments, the tension controller in the cleaning apparatus enables the cleaning wipe 20 to be made from less durable materials such as a non-woven material, and the tension controller also permits the apparatus to also function with a wetted cleaning wipe.

Force Controller

Aspects of the present invention may contemplate controlling the force exerted by the cleaning tip 22 against an optical fiber. A certain amount of force against the optical fiber may be needed to adequately engage the fiber to clean and remove certain contaminants from the optical fiber. However, too great of a force may potentially damage and/or break the optical fiber. For example, too great a force may act to drag a contaminant across the optical fiber which may scratch the fiber. Therefore, a certain force or force range exerted by the cleaning tip 22 may be desirable for cleaning an optical fiber. The specific desired force or force range may depend upon a variety of factors including, but not limited to, the type and size of optical fiber.

One illustrative embodiment of a force controller will now be described with reference to FIGS. 3 and 4. As discussed above, in one embodiment, the cleaning tip 22 is moveable relative to the housing 30. This movement of the cleaning tip 22 may be linear and/or rotational movement with respect to the housing 30. As described above, the cleaning tip 22 may be coupled to a main carriage 60 for movement therewith. In one embodiment, an actuator, such as a carriage motor 106, imparts linear movement into the cleaning tip 22 through the movement of the main carriage 60.

In one embodiment illustrated in FIG. 3, a driving carriage 108 may be coupled to the main carriage 60 and the carriage motor 106. One end of a linkage 110 may be fixed to the driving carriage 108 at a pivot point 112 while the other end of the linkage 110 may be movably supported by the main carriage 60. In this illustrative embodiment, the movable end of the linkage 110 is coupled to the main carriage 60 at fixed points 116, 118 with two extension springs 114 which extend outwardly from the linkage 110.

To advance the main carriage 60 and cleaning tip 22 in a linear direction towards the optical fiber and fiber optic connector 10, the carriage motor 106 may be actuated. As shown in FIGS. 3 and 4, this actuation translates into linear movement of the driving carriage 108 through gears 120 which turn ball screw 122 which may move a follower 124 coupled to the driving carriage 108. As the driving carriage 108 moves forward, the main carriage 60 also moves in a forward direction with the driving carriage 108. It should be appreciated that other suitable mechanisms apparent to one of skill in the art for moving the carriages in a linear direction are also contemplated as the present invention is not limited in this respect.

In the illustrative embodiment, the force exerted by the cleaning tip 22 against an optical fiber may be controlled by the springs 114. In particular, when there is no or little force exerted by the cleaning tip 22, there may be little to no deflection of the springs 114. There may not be significant spring deflection because the main carriage 60 will follow the movement of the driving carriage 108. Once the cleaning tip 22 contacts or engages an optical fiber, the forward movement of the cleaning tip 22 may be limited by the contact with the fiber. However, this contact may not stop movement of the driving carriage 108 because the two carriages may be resiliently coupled together by the springs. The springs may then deflect due to movement of the driving carriage relative to the main carriage. This spring deflection may correspond to the amount of force exerted by the cleaning tip 22. The greater the deflection in the springs 114, the greater the amount of force exerted the cleaning tip 20.

This deflection may be measured to determine the force exerted by the cleaning tip 22 on the optical fiber. In one embodiment, the force may be calculated based upon the spring deflection and the spring constant. With this data, the force against the optical fiber may be controlled and maintained, for example, by regulating the movement of the cleaning tip 22 with respect to the housing 30. In one embodiment, a substantially constant force against the optical fiber may be achieved by maintaining a substantially constant spring deflection. As discussed in greater detail below, force data may be transmitted to a control system which may be used to regulate the amount of force exerted against the optical fiber.

In one embodiment, the amount of spring deflection may be measured by a sensor which monitors the relative difference in motion between the main carriage 60 and the driving carriage 108. However it should be appreciated that the force exerted against an optical fiber may also be measured and controlled in other ways apparent to one of skill in the art, as the present invention is not so limited.

Another illustrative embodiment for controlling and maintaining the force exerted by the cleaning tip 22 against an optical fiber will now be described. This embodiment is related to one of the above-described embodiments for controlling tension in the cleaning wipe 20. In this embodiment, the carriage motor 106 may still turn ball screw 122 which moves the driving carriage 108 in a forward direction. The driving carriage 108 may also still move the main carriage 60 in a forward direction through the resilient spring coupling. As the main carriage 60 and the cleaning tip 22 move forward, the cleaning wipe 20 may be advanced along the cleaning tip 22 by the take-up motor 130. As explained above, when the cleaning wipe 20 contacts the optical fiber, the cleaning wipe may be "pinched" between the optical fiber and the cleaning tip 20 which may cause an increase in the tension in the cleaning wipe 20. This tension may cause the tension dancer arm assembly 140 to rotate in a counterclockwise direction. This motion may be detected and sensed by the dancer encoder 148. The axial force exerted against the optical fiber may also be determined based upon the sensed amount of rotation of the dancer arm assembly 140. The force exerted on the optical fiber may be held substantially constant by maintaining the angular position of the dancer arm assembly 140. As stated above, the force data may be transmitted to a control system which may be used to regulate the amount of force exerted against the optical fiber.

Yet another embodiment for controlling and maintaining the force exerted by the cleaning tip 22 against an optical fiber is illustrated in FIG. 2. Force regulator springs 122 may be provided with one end of each spring 122 coupled to the main carriage 60 and the other end of the springs 122 may be coupled to the housing 30. As the cleaning tip 22 moves in a forward direction with the main carriage 60, the regulator springs 122 may deflect. Once the cleaning tip 22 engages an optical fiber, forward movement of the cleaning tip 22 and main carriage may stop, preventing further deflection of the springs 122. However, force against the optical fiber may continue to increase if the cam actuator 62 is still moving. Data taken from the springs 122 and the actuator 62 may be utilized to determine and control the force exerted against an optical fiber similar to some of the above-described embodiments.

Cleaning Wipe

Aspects of the present invention are directed to the cleaning wipe 20. As described above, the cleaning wipe 20 may be formed of various materials, including woven and non-woven materials. In some embodiments, a non-woven material, such as a paper-based or felt-based material, may be more effective at removing contaminants. Although a non-woven material may be less durable in comparison to a woven material, certain embodiments of the apparatus including a tension controller may reduce the incidence of tearing less durable materials, such as non-woven materials.

In some embodiments, the cleaning wipe is a lint-free material. It is contemplated that the cleaning wipe is formed from a standardized clean room wipe material, and may for example be a mixture of cellulose and polyester. However, it should be appreciated that other suitable materials apparent to one of skill in the art may be used to form the cleaning wipe 20 as the invention is not so limited. In some embodiments, the cleaning wipe may form a narrow web or an elongated ribbon-like configuration similar to conventional dental floss. The width of the cleaning wipe may also vary depending upon the diameter of the optical fiber to be cleaned.

Figure 5:
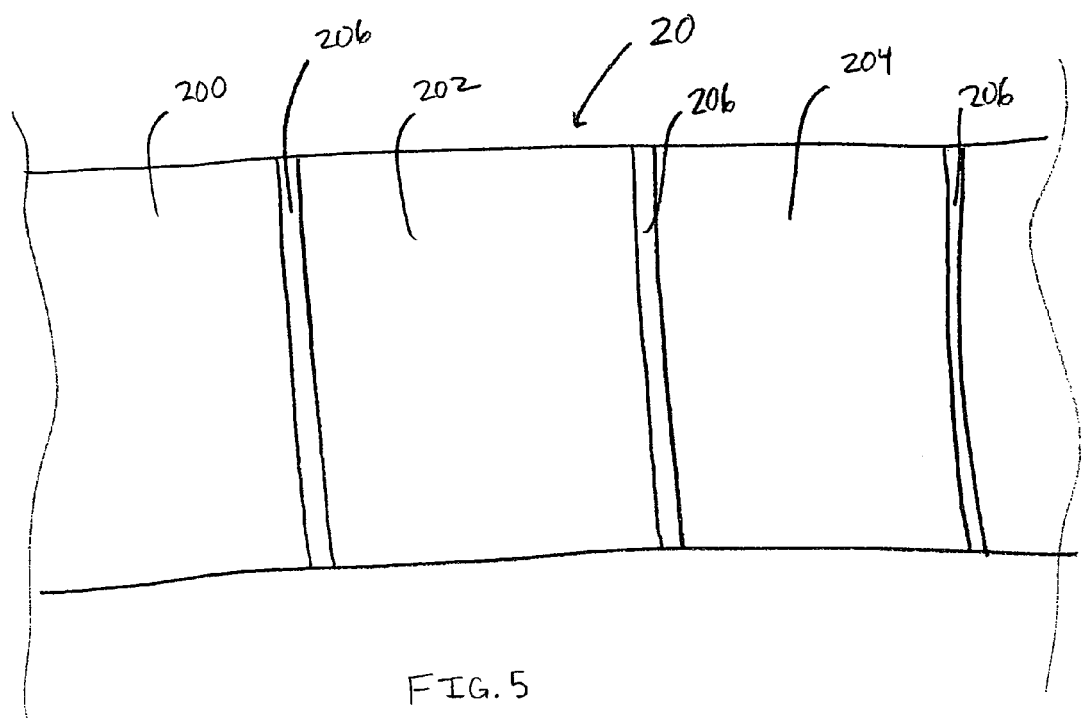
FIG. 5 is a schematic view of a portion of a cleaning wipe according to one illustrative embodiment.

In the illustrative embodiment of FIG. 5, it is also contemplated that the cleaning wipe 20 includes at least one fluid barrier positioned between portions of the cleaning wipe 20 such that fluid on one side of the barrier may not pass through the fluid barrier. In this manner, the fluid barrier 206 may prevent wicking of a cleaning fluid across the cleaning wipe. In one embodiment, a cleaning wipe with a fluid barrier may be used to assist in carrying out the alternating steps of wet and dry wiping by preventing fluid from a wet portion to migrate into an adjacent dry portion.

For example, as shown in FIG. 5, a cleaning wipe 20 includes a first wettable portion 200, a second wettable portion 202, and a fluid barrier 206 positioned between the first wettable portion 200 and the second wettable portion 202 to prevent fluid flow. As shown in the illustrated embodiment of FIG. 5, a plurality of fluid barriers 206 may be provided spaced apart along the cleaning wipe 20 to prevent fluid flow between numerous portions 202, 204, 206 of the cleaning wipe. As shown, the fluid barriers 206 may transversely extend along the cleaning wipe 20. In one embodiment, the first wettable portion 200 is wetted with a cleaning fluid, while a second wettable portion 202 of the cleaning wipe 20 adjacent the first portion 200 remains substantially free of the fluid. The first wettable portion 200 may be advanced across the end face of an optical fiber to clean the fiber, and thereafter the second wettable portion 202 may be advanced across the end face of the optical fiber to further clean the fiber and may remove cleaning fluid which remained on the fiber.

The fluid barrier 206 may be formed by a variety of techniques as the present invention is not so limited. In one illustrative embodiment, a fluid barrier may be formed by creating a heat seal across the width of the cleaning wipe 20. Such a seal may be made by running a hot knife along the cleaning wipe 20 to melt a portion of the wipe material. However, it should be understood that fluid barriers 206 are not required in all embodiments of the present invention. It is also to be appreciated that fluid barriers 206, if desired, may be formed with other suitable techniques apparent to one of skill in the art, as the present invention is not so limited.

Automation of Cleaning Apparatus

Aspects of the present invention are directed to an automated apparatus for cleaning an optical fiber supported by a fiber optic connector. An apparatus with one or more automated features may enhance the effectiveness of removing contaminants from an optical fiber.

As mentioned above, the housing 30 may include a trigger 36 (see FIG. 2) which may be provided to actuate a cleaning process the optical fiber. In one embodiment, once the cleaning apparatus is aligned with the optical fiber and/or connector, an operator may depress the trigger 36 to actuate an automatic cleaning process or cycle. Once the cleaning process is actuated, the operator may only have to hold the cleaning apparatus against the connector cavity 12 until the cleaning process is completed. The cleaning apparatus 100 may include an indicator 90, such as an LED, which may signal to the operator that the cleaning process is complete, such that the operator will know when he/she can remove the cleaning apparatus.

It is contemplated that the mechanical wiping of the optical fiber and/or the application of the cleaning fluid may be automated with certain embodiments of the cleaning apparatus. The movement of the cleaning tip 22 in and out of the housing 30 may also be automated. As the cleaning wipe 20 is advanced along the cleaning tip 22, at certain intervals, the fluid dispenser 70 may automatically wet portions of the cleaning wipe 20 to clean the optical fiber.

Figure 6:
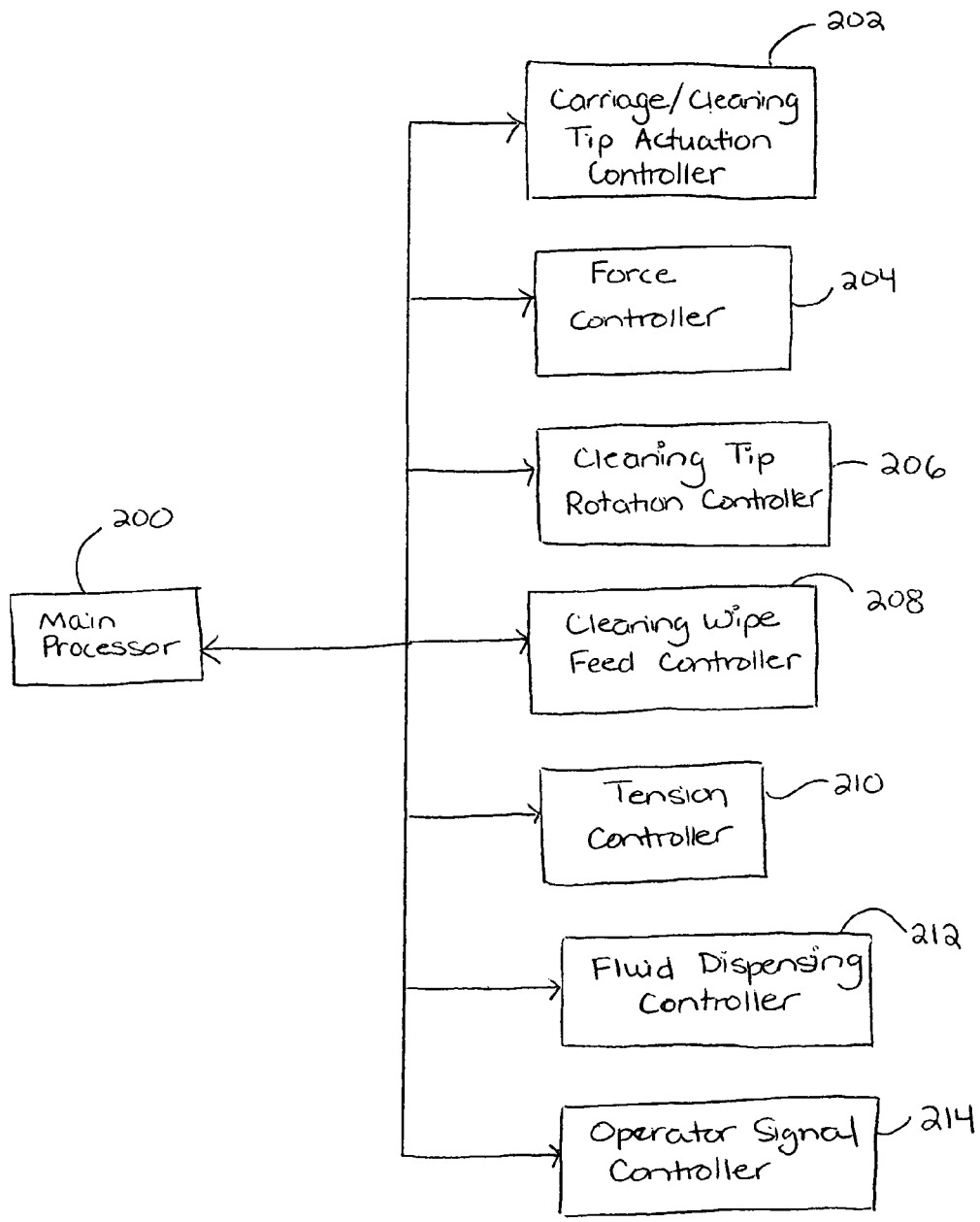
FIG. 6 is a control block diagram for a main processor according to one illustrative embodiment.

Various types of controls may be incorporated into the cleaning apparatus to automate different features of the apparatus. In one illustrative embodiment shown in the control block diagram in FIG. 6, a main processor 200 may interact with and control one or more different controllers. As shown, a carriage/cleaning tip controller 202 may be used to send an actuator control signal to control the linear movement of the cleaning tip 22.

A force controller 204 may be used to send a force control signal to control and maintain the force exerted against an optical fiber based upon a desired force or force range. As discussed above, data regarding the force exerted on an optical fiber may be transmitted to a control system, such as the main processor 200, to regulate the amount of force exerted against the optical fiber.

Another type of controller includes a cleaning tip rotation controller 206 which may be used to send a rotation control signal to the rotator motor 104 (see FIG. 3) to actuate rotation of the cleaning tip in response to an actuator control signal.

A cleaning wipe feed controller 208 may be used to send a drive control signal to the drive mechanism to advance the cleaning wipe 20. The cleaning wipe feed controller 208 may be used to send a drive control signal to the take-up motor 130 to unwind the cleaning wipe from the feed reel.

A tension controller 210 may be used to send a tension control signal to control and maintain the tension in the cleaning wipe. The tension controller 210 may determine tension based upon data from the tension dancer arm assembly 140.

A fluid dispensing controller 212 may be used to send a fluid control signal to the fluid dispenser 70 to control and maintain the volume and timing of fluid dispensed onto the cleaning wipe. The fluid dispensing controller 212 may also, in combination with the cleaning wipe feed controller 208, control how fluid is dispensed along the length of the cleaning wipe 20. For example, in embodiments where alternating wet/dry portions of the cleaning wipe 20 is desirable, the timing between intermittent dispensing of fluid from the fluid dispenser 70 combined with the speed of the advancement of the cleaning wipe 20 may be controlled through the main processor 200 to achieve a desirable wet/dry cleaning pattern.

There may also be an operator signaling controller 214. This feature will now be explained. In some circumstances, it may be desirable to inhibit the actuation of the cleaning apparatus until it is positioned in a desired location. For example, in one embodiment, the cleaning apparatus may not be actuated until the apparatus is aligned with an optical fiber or connector. This may prevent wasting the cleaning wipe and/or the cleaning fluid. In one embodiment, a sensor 92 (see FIG. 2) may be located on the cleaning apparatus to determine whether the apparatus is against a connector or optical fiber. For example, before the sensor 92 senses an optical fiber or a connector, the operator may not be able to actuate the automated cleaning process by depressing the trigger 36. However, once the sensor 92 senses that the apparatus is docked against a connector, the apparatus may then be configured such that the operator may actuate the automated process. In one embodiment, once the apparatus is docked against a connector, the indicator 90 may turn on or flash to signal to the operator that he/she may actuate the process. In the illustrative embodiment of FIG. 2, the sensor 92 extends about the distal portion of the elongated support 32 of the housing 30. However, it should be appreciated that various types of sensors, such as proximity sensors and optical sensors may also be used as the present invention is not so limited.

Software or firmware may control the desired sequence of the automated operation of the cleaning process. Although the specific sequence may be programmed for certain applications, the following sequence of automated operations is contemplated by the present invention. First, a sensor 92 may sense when the apparatus is docked against a connector or optical fiber. Thereafter, a signal may be sent to the operator via the indicator 90, to signal that the operator is able to actuate the cleaning process. Thereafter, the operator may actuate the automated cycle by depressing the trigger 36.

Through the main processor 200, the cleaning tip 22 may be extended linearly to contact the end face of the optical fiber. The main processor 200 may also actuate the advancement of the cleaning wipe 20 along the cleaning tip 22. The main processor 200 may also control the rotation of the cleaning tip 22 which may occur as the cleaning wipe 20 is advanced, and the dispensing of the cleaning fluid onto the cleaning wipe 20 at predetermined intervals.

Once the optical fiber is cleaned with the cleaning wipe 20, the main processor may signal the cleaning tip 22 to return to its original rotational orientation, signal the fluid dispenser 70 to cease dispensing fluid, and/or signal the cleaning tip 22 to retract into the housing 30. The main processor 200 may further signal the advancing of the cleaning wipe 20 to cease and thereafter a signal may be sent to the operator via the indicator 90 to specify that the automated cleaning process is completed so that the operator may remove the cleaning apparatus from the connector.

It is contemplated that in certain embodiments, the cleaning apparatus 100 is cordless and battery powered, and both the batteries and the main processor 200 may be located within the housing 30. However, it should be appreciated that it is also contemplated for certain components to be outside of the housing 30 and the apparatus may also be powered by standard AC current.

Replaceable/Detachable Components

For some applications, it may be desirable for one or more components of the cleaning apparatus to be detachable and replaceable. In this respect, certain components, such as the fluid dispenser 70 and the cleaning wipe 20, may be discarded after use without having to discard the entire cleaning apparatus. This may be desirable to maximize the life of reusable components including, but not limited to, the housing, the controls, actuators, encoders, etc.

Figure 7:
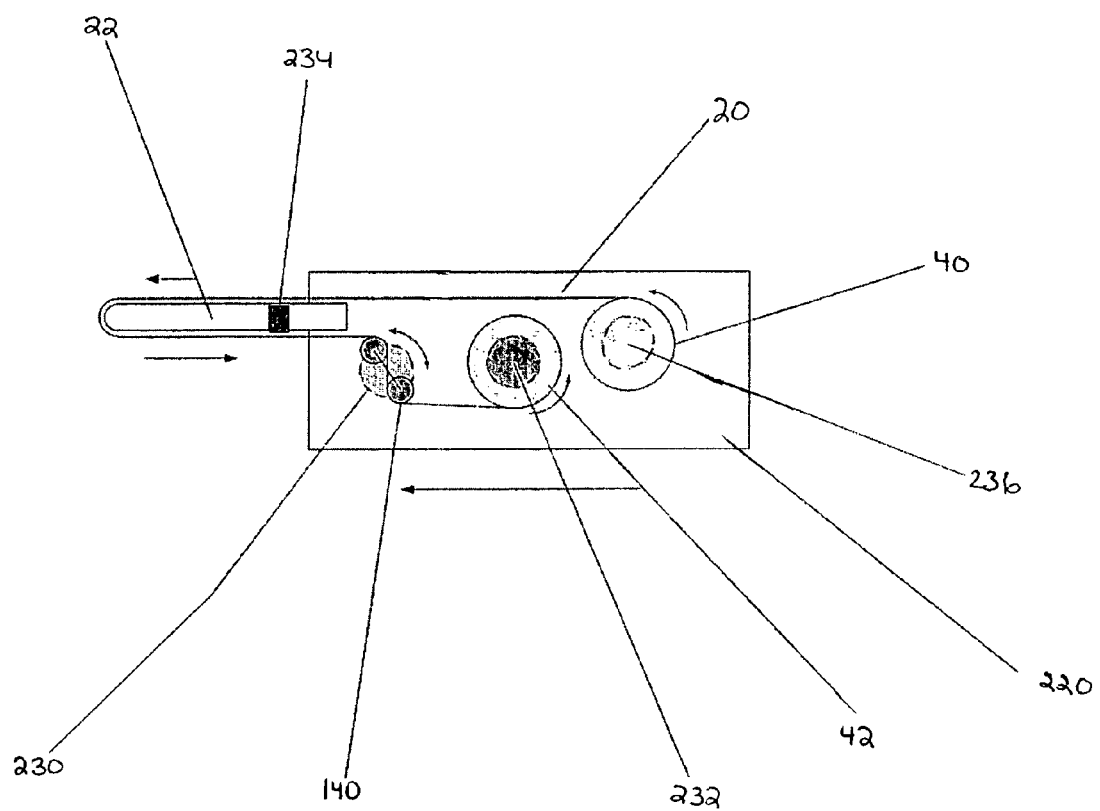
FIG. 7 is a schematic view of a cleaning wipe cartridge according to one illustrative embodiment.

In one illustrative embodiment shown in FIG. 7, the cleaning wipe 20 may be detachable and replaceable. For example, in one embodiment, once the supply of the cleaning wipe 20 provided on the feed reel 40 is exhausted, the used cleaning wipe may be discarded and replaced with a fresh supply of cleaning wipe.

In the illustrated embodiment of FIG. 7, the cleaning wipe 20 may be contained within a cartridge 220. To insert a new cleaning wipe 20 into the apparatus, the operator may open up a portion of the housing 30 to remove the spent cleaning wipe cartridge 220 and may replace it with a new cleaning wipe cartridge 220. The replacement process may be similar to inserting a cassette into a cassette player. It is also contemplated that the cartridge 220 may include features which engage with features in the housing 30 for a snap-fit.

As shown in FIG. 7, the cartridge 220 may include a supply of cleaning wipe 20, a feed reel 40 and a take-up reel 42. The cartridge 200 may further include a replacement cleaning tip 22 and a tension dancer arm assembly 140. However, other embodiments of the cartridge 220 may not include all of these components and/or may include additional components.

The cartridge 220 may be constructed such that various mechanisms in the housing 30, such as encoders and actuators, may align and mate with portions of the cartridge 220. For example, as discussed above, in some embodiments, a dancer encoder 148 is provided to sense rotation of the dancer arm assembly 140. The cartridge 220 may include a coupling 230 proximate the tension dancer arm assembly 140 such that the dancer encoder 148 in the housing 30 may continue to sense rotation of the new dancer arm assembly 140. Another coupling 236 may be provided proximate the new feed reel 40 so that the feed reel encoder 62 may continue to sense the rotation of the feed reel 40. Similarly, a coupling 232 may be provided so that the new take-up reel 42 may be driven by the take-up motor 130. Furthermore, in embodiments where the cleaning tip moves rotationally to clean an optical fiber, a gear coupling 234 may be provided on the new cleaning tip in the cartridge 220 to connect the cleaning tip to the rotation motor 104. However, it is appreciated that some embodiments which feature a cartridge 220 for replacing the cleaning wipe 20 may not include each of these couplings.

In another embodiment, portions of the fluid dispenser 70 may be detachable so that when the fluid source is depleted, a new supply of cleaning fluid may be added to the cleaning apparatus. It is contemplated that the cleaning fluid may be added to the existing fluid chamber 72. However, it is also contemplated that the apparatus may include a detachable fluid chamber 72 or fluid cartridge. Similar to the above-described cleaning wipe cartridge 220, a fluid cartridge (not shown) may also be accessible through an opening in the housing 30 and may be supported by the housing with a snap-fit or other suitable engagement. Furthermore, it is also contemplated that the fluid cartridge and the cleaning wipe cartridge may be formed a single unit. However, in some embodiments, the cleaning wipe 20 may require replacement more often than the cleaning fluid, so it may be desirable to employ separately replaceable cartridges.

Adaptors

Aspects of the present invention are drawn to various adaptors that facilitate positioning of the cleaning apparatus relative to the fiber optic connector. In some illustrative embodiments, the adaptor includes a stabilizer that is supported on the housing 30 of the cleaning apparatus. The stabilizer may be configured to engage the connector to stabilize the housing 30 with respect to the connector by maintaining a fixed angular orientation of the housing relative to the connector. Illustrative embodiments of a stabilizer 300 are explained with reference to FIGS. 8-12.

As discussed above, in certain embodiments, the operator handling the cleaning apparatus 100 may simply be required to hold the apparatus while an automatic optical fiber cleaning process is performed. It may be desirable for the operator to hold the apparatus in a specific angular position while performing the cleaning process. For example, in one illustrative embodiment, it may be desirable for the cleaning apparatus to be held such that the longitudinal axis of the cleaning tip 22 is substantially perpendicular to an end face of an optical fiber. Altering the angular orientation of the housing 30 during the cleaning process may cause damage to the optical fiber and/or the cleaning apparatus itself. However, if the cleaning apparatus does not have a wide base proximate the connector 10, slight movements by the operator may change the angular orientation of the apparatus. Therefore, in certain embodiments, the stabilizer 300 provides a wide base to hold the apparatus steady as an optical fiber is cleaned.

Figure 8:
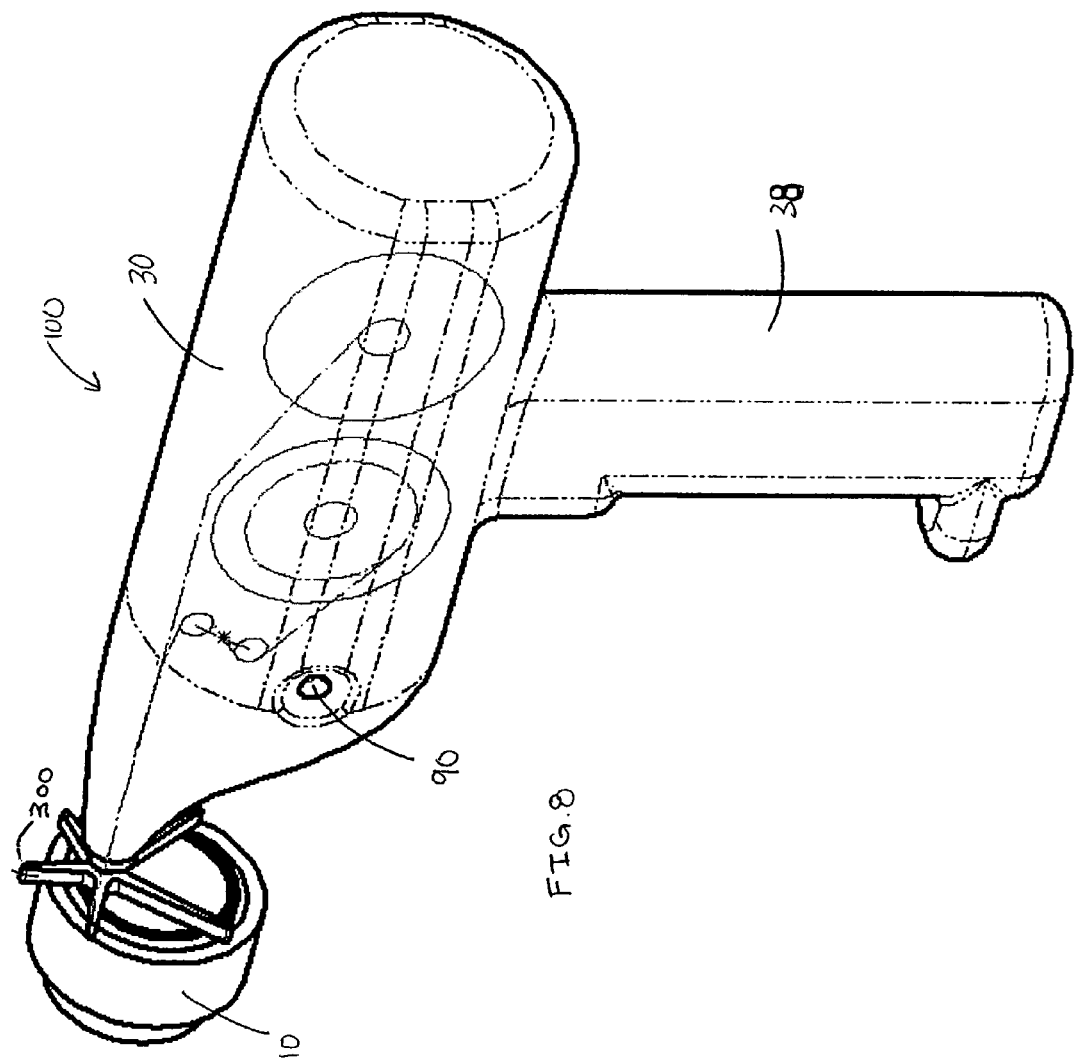
FIG. 8 is a perspective view of an apparatus for cleaning an optical fiber including a stabilizer according to one illustrative embodiment.
Figure 9:
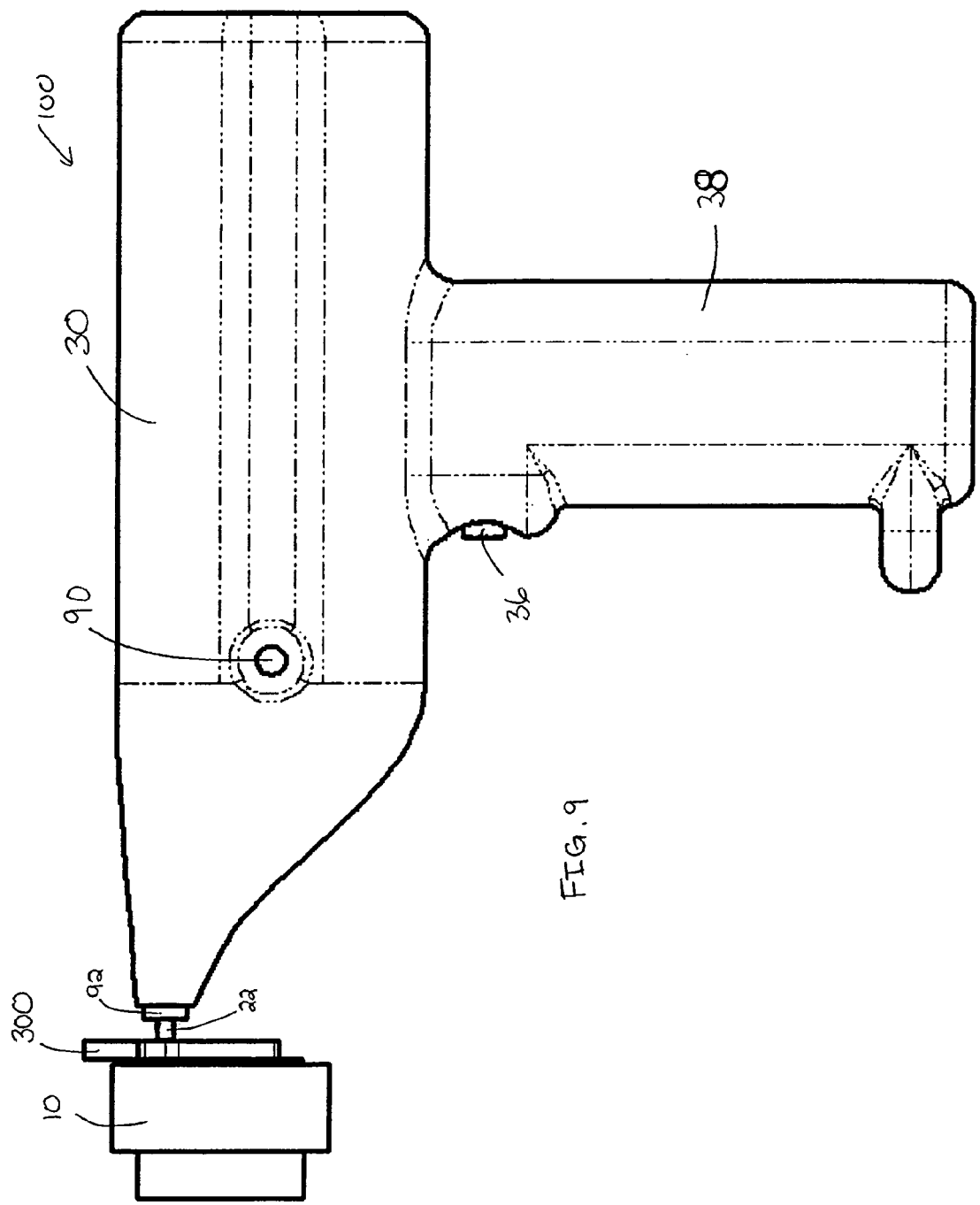
FIG. 9 is a side view of the apparatus for cleaning an optical fiber of FIG. 8.

As shown in the illustrative embodiments of FIGS. 8 and 9, a stabilizer 300 may be attached to the housing 30 to support the cleaning apparatus 100 using a wide base with respect to a fiber optic connector 10. In this embodiment, the stabilizer 300 may align and/or maintain the axis 250 of the cleaning tip 22 with the axis of the cavity in the connector 10.

In one illustrative embodiment, the stabilizer 300 maintains the angular orientation of the housing 30 with respect to the connector 10 by contacting the fiber optic connector 10 at least at three spaced apart locations. As shown in the figures, the stabilizer 300 may also maintain the angular orientation by extending out to and contacting the periphery of the connector. In certain embodiments, the stabilizer 300 is configured to contact the outer periphery 260 of the connector at a plurality of locations. As shown in FIG. 10, in some embodiments, a connector 10 may be formed with an annular peripheral portion defining an inner periphery 270 and an outer periphery 260 of the connector, and the stabilizer 300 contacts at least a portion of the periphery portion of the connector 10.

In one illustrative embodiment, the stabilizer 300 includes a plurality of arms 304 extending outwardly from a central region. In this regard, the stabilizer 300 may be substantially star-shaped. The central region may include an opening 302 therethrough, such that at least a portion of a cleaning media, such as the cleaning wipe 20, can pass through the opening 302 to access a portion of the optical fiber. It should be appreciated that in some embodiments, cleaning media may broadly include cleaning fluid, cleaning tips, pressurized air, and the like. As shown in the embodiment of FIG. 8, the housing 30 of the cleaning apparatus may be coupled to the stabilizer 300 through this opening 302 in the central region of the stabilizer 300.

As illustrated in the embodiments of FIGS. 10-12, the stabilizer 300 may be shaped such that the distance between the opening 302 in the stabilizer 300 and the outer perimeter of the stabilizer is non-uniform. In this embodiment, the orientation of the stabilizer may be adjusted to accommodate obstructions, such as fixed walls or other components, in close proximity to the connector. For example, the shorter portion of the stabilizer may be positioned closer to the obstruction, as shown in FIG. 11.

In one illustrative embodiment shown in FIGS. 10-12, the stabilizer 300 includes a plurality of arms 304 extending outwardly from the central region, where the plurality of arms 304 are of varying lengths. The arms 304 of differing lengths may permit the stabilizer 300 to be used with a cleaning apparatus where there may be limited space around the connector 10 due to obstructions. For example, in the embodiment of FIGS. 11 and 12, the connector 10 is shown positioned proximate a fixed wall 350. An optical fiber recessed with the connector 10 may still be accessed by a cleaning apparatus with a stabilizer 300 even when the optical fiber is positioned close to the wall 350 due to the positioning of the shorter arms 304 closer to the fixed wall 350.

As shown, in one embodiment, the optical fiber to be cleaned may be a short distance 360, 362 away from the fixed wall. Although the size and configuration of the stabilizer 300 may vary for a particular use, in one embodiment, the stabilizer 300 may be sized such that the distance 360, 362 away from the fixed wall 350 is from approximately 0.4 to approximately 1.0 inch. In other embodiments, the same stabilizer 300 may be used in a different orientation if the placement of obstructions around the connector change.

It should be understood that although FIGS. 10-12 illustrate a star-shaped stabilizer 300 that all embodiments of the present invention do not require a stabilizer. Furthermore, other shaped stabilizers 300 configured to maintain a fixed angular orientation of the housing relative to the connector apparent to one of skill in the art may also be used. For example, in one embodiment, the stabilizer may be a substantially planar, and may be substantially disc-shaped. It is contemplated, for example, that the stabilizer may be circular, triangular, or rectangular in shape, as the present invention is not so limited. In one embodiment, the stabilizer has a peripheral configuration such that the distance between the opening 302 in the stabilizer 300 and the outer perimeter of the stabilizer varies to be able to adjust the orientation of the stabilizer 300 to accommodate obstructions.

In one embodiment, at least a portion of the connector 10 is visible through the stabilizer 300. This may enable the operator to easily align the stabilizer 300 and cleaning apparatus 100 with an optical fiber and connector. For example, in one illustrative embodiment shown in FIGS. 10-12, at least a portion of the connector 10 is visible in between the plurality of arms 304 of the stabilizer 300. It is also contemplated that portions of the stabilizer 300 may be made from a transparent material to enable the connector 10 to be visible through the stabilizer 300.

It is also contemplated that an adaptor (not shown) configured for a particular type of optical fiber or connector 10 may be attached to the housing 30. Such an adaptor may be specific for male connectors and female connectors. For example, in one embodiment, an adaptor may be configured similar to the elongated support 32 of the housing 30 (see FIG. 2). This adaptor may attach to the housing to assist in cleaning certain shaped fiber optic connectors.

It should be understood that the foregoing description of various embodiments of the invention are intended merely to be illustrative thereof and that other embodiments, modifications, and equivalents of the invention are within the scope of the invention recited in the claims appended hereto.

What is claimed is:

1. A method of cleaning an optical fiber supported by a fiber optic connector, the method comprising acts of:
    (a) providing a cleaning apparatus that includes a cleaning wipe that is advanceable along at least a portion of the cleaning apparatus, the cleaning apparatus further including a fluid dispenser with a cleaning fluid, the fluid dispenser being located within the cleaning apparatus;
    (b) wetting a portion of the cleaning wipe within the cleaning apparatus with the cleaning fluid from the fluid dispenser, while an adjacent dry portion of the cleaning wipe remains substantially free of the cleaning fluid;
    (c) advancing the wet portion of the cleaning wipe across an end face of an optical fiber supported by a fiber optic connector to clean the optical fiber; and
    (d) advancing the dry portion of the cleaning wipe across the end face of the optical fiber to clean the optical fiber.

2. The method of claim 1, further comprising acts of:
    (e) repeating steps (b), (c), and (d) such that alternating wet and dry portions of the cleaning wipe advance across the end face of the optical fiber.

3. The method of claim 1, wherein at least one of acts (a), (b), (c), and (d) is automated in response to a control signal via a controller.

4. The method of claim 1, further comprising acts of:
    (e) engaging a portion of the cleaning wipe with the optical fiber to exert a force on the optical fiber by the cleaning wipe; and
    (f) automatically controlling the force exerted by the cleaning apparatus against the optical fiber in response to a force control signal via a force controller and based upon data regarding the force exerted on the optical fiber.

5. The method of claim 1, further comprising acts of:
    (e) placing tension on the cleaning wipe; and
    (f) automatically controlling the tension on the cleaning wipe in response to a tension control signal via a tension controller and based upon data regarding the tension placed on the cleaning wipe.

6. The method of claim 1, further comprising an act of:
    (e) automatically rotating the cleaning wipe as the wipe is being advanced along the end face of the optic fiber.

7. The method of claim 3, wherein each one of acts (a), (b), (c), and (d) are automated in response to a control signal.

8. A method of cleaning an optical fiber supported by a fiber optic connector, the method comprising acts of:
    (a) providing a cleaning apparatus, the cleaning apparatus including a cleaning wipe that is advanceable along at least a portion of the cleaning apparatus, the cleaning apparatus further including a fluid dispenser with a cleaning fluid, the fluid dispenser being located within the cleaning apparatus;
    (b) wetting a portion of the cleaning wipe within the cleaning apparatus with the cleaning fluid from the fluid dispenser;
    (c) engaging the portion of the cleaning wipe with an optical fiber supported by a fiber optic connector to exert a force on the optical fiber by the cleaning wipe and to clean a portion of the optical fiber with the cleaning wipe; and
    (d) automatically controlling the force exerted by the cleaning wipe in response to a force control signal via a force controller and based upon data regarding the force exerted on the optical fiber when the cleaning wipe contacts the optical fiber.

9. The method of claim 8, further comprising an act of:
    (e) automatically advancing the cleaning wipe along a portion of the cleaning apparatus in response to a drive control signal via a feed controller.

10. The method of claim 8, wherein act (b) includes:
    automatically wetting at least a first portion of the cleaning wipe with the cleaning fluid in response to a fluid control signal via a fluid dispensing controller; and the method further comprises an act of:
    (e) automatically advancing the first portion of the cleaning wipe across the end face of the optical fiber in response to a drive control signal via a feed controller.

11. A method of cleaning an optical fiber supported by a fiber optic connector, the method comprising acts of:

(a) providing a cleaning apparatus, the cleaning apparatus including a cleaning wipe that is advanceable along at least a portion of the cleaning apparatus to clean a portion of an optical fiber supported by a fiber optic connector when the cleaning wipe engages the optical fiber, the cleaning apparatus further including a fluid dispenser with a cleaning fluid, the fluid dispenser being located within the cleaning apparatus;

(b) wetting a portion of the cleaning wipe within the cleaning apparatus with the cleaning fluid from the fluid dispenser;

(c) placing tension on the cleaning wipe; and (d) automatically controlling the tension on the cleaning wipe in response to a tension control signal via a tension controller and based upon data regarding the tension placed on the cleaning wipe.

12. The method of claim 11, further comprising an act of:

(e) automatically advancing the cleaning wipe across the end face of the optical fiber in response to a drive control signal via a feed controller.

13. The method of claim 11, wherein act (b) includes:

automatically wetting at least a first portion of the cleaning wipe with the cleaning fluid in response to a fluid control signal via a fluid dispensing controller; and the method further comprises an act of:

(e) automatically advancing the first portion of the cleaning wipe across the end face of the optical fiber in response to a drive control signal via a feed controller.

* * * * *